United States Patent
Michaud et al.

(10) Patent No.: US 11,706,638 B2
(45) Date of Patent: Jul. 18, 2023

(54) OPTIMIZED ONBOARDING OF DEVICES IN A WIRELESS NETWORK

(71) Applicant: ARRIS Enterprises LLC, Suwanee, GA (US)

(72) Inventors: Ted R Michaud, Medford, NJ (US); Paul Baker, San Diego, CA (US); Donald Cochrane, Barrington, NH (US); Jay William Strater, San Diego, CA (US); Michael J. Hartman, Chelmsford, MA (US); Gregory N. Nakanishi, San Diego, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 79 days.

(21) Appl. No.: 17/324,434

(22) Filed: May 19, 2021

(65) Prior Publication Data

US 2021/0368361 A1 Nov. 25, 2021

Related U.S. Application Data

(60) Provisional application No. 63/027,518, filed on May 20, 2020.

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/318* (2015.01); *H04W 16/26* (2013.01);
(Continued)

(58) Field of Classification Search
CPC ..... H04W 24/02; H04W 16/26; H04W 24/10; H04W 48/14; H04W 88/16; H04W 8/00;
(Continued)

(56) References Cited

U.S. PATENT DOCUMENTS

| 9,420,524 | B1 | 8/2016 | Dalvi et al. | |
| 9,538,446 | B1 * | 1/2017 | Kaushik | H04B 17/318 |
| 2011/0222517 | A1 * | 9/2011 | Ishii | H04W 88/04 |
| | | | | 370/338 |
| 2013/0170374 | A1 * | 7/2013 | Aljadeff | H04W 4/02 |
| | | | | 370/252 |
| 2014/0355579 | A1 * | 12/2014 | Viswanathan | H04W 12/50 |
| | | | | 370/338 |

(Continued)

FOREIGN PATENT DOCUMENTS

WO 2020/132448 6/2020

OTHER PUBLICATIONS

Wilson Amplifiers, "20 Things to Know About WiFi Boosters and Extenders," dated Apr. 14, 2020, available at: https://www.wilsonamplifiers.com/blog/things-to-know-about-wifi-boosters-and-extenders/ (Year: 2020).*

(Continued)

*Primary Examiner* — Will W Lin
(74) *Attorney, Agent, or Firm* — Wenderoth, Lind & Ponack, L.L.P.

(57) ABSTRACT

An apparatus, method, and computer-readable recording medium perform client optimized onboarding in a wireless network. A network controller of a gateway device determines a first received signal strength indicator (RSSI) of a new client device, receives a second RSSI of the new client device from each of one or more wireless extenders, and determines a strongest RSSI among the determined first RSSI and the received second RSSI from each of the one or more wireless extenders. The network controller of the gateway device receives an onboarding request with respect to any one or the gateway device and the one or more wireless extenders, and sends a command to proceed with an onboarding operation of the new client device to any one of the gateway device and the one or more wireless extenders having the strongest RSSI from the new client device.

17 Claims, 4 Drawing Sheets

(51) Int. Cl.
*H04W 16/26* (2009.01)
*H04W 24/10* (2009.01)
*H04W 48/14* (2009.01)
*H04W 88/16* (2009.01)

(52) U.S. Cl.
CPC ........... *H04W 24/10* (2013.01); *H04W 48/14* (2013.01); *H04W 88/16* (2013.01)

(58) Field of Classification Search
CPC ..... H04W 8/005; H04W 48/20; H04W 88/04; H04W 88/08; H04W 12/55; H04W 12/50; H04B 17/318
See application file for complete search history.

(56) References Cited

U.S. PATENT DOCUMENTS

| | | | |
|---|---|---|---|
| 2018/0183666 A1 | 6/2018 | Likar et al. | |
| 2018/0288768 A1 | 10/2018 | Emmanuel et al. | |
| 2019/0075469 A1* | 3/2019 | Mahoney | H04W 16/10 |
| 2019/0327616 A1* | 10/2019 | Ganu | H04B 17/318 |
| 2021/0120483 A1* | 4/2021 | Hodoshima | H04W 48/20 |

OTHER PUBLICATIONS

International Search Report and the Written Opinion of the International Search Authority dated Aug. 9, 2021 in International (PCT) Application No. PCT/US2021/033087.

International Preliminary Report on Patentability dated Nov. 17, 2022 in International (PCT) Application No. PCT/US2021/033087.

\* cited by examiner

OPTIMIZED ONBOARDING OF DEVICES IN A WIRELESS NETWORK

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device for the control and management of devices in the wireless network to the improve quality of experience (QoE) for users. Additionally, there have been advances in the connecting or onboarding of a new wireless device to a wireless network. For example, a user can implement a wireless protected setup (WPS). Using WPS, a user physically pushes a WPS button on the new wireless device and a WPS button on another WPS-enabled device (e.g., gateway, access point, or wireless extender) to connect or onboard the new wireless device to a wireless network using the WPS protocol.

An advantage of using WPS is that a user does not need to know the SSID and security code or password when connecting WPS-enabled devices to the wireless network. However, WPS is only useful for connecting or onboarding the new wireless device with another WPS-enabled device (e.g., gateway device, access point, or wireless extender) on which the user presses the WPS button, which is not always the best WPS-enabled device for onboarding to a wireless network. For example, the WPS-enabled device (e.g., gateway device, access point, or wireless extender) on which the user presses the WPS button may be located too far from the new wireless device and, therefore, may not have the best signal strength from providing a good connection and content to the new wireless device.

Thus, it would be advantageous and an improvement over the relevant technology to provide optimized connecting or onboarding of a new wireless device to a wireless network by using the best WPS-enabled device (e.g., gateway device, access point, or wireless extender), regardless of the WPS-enable device (e.g., gateway, access point, and wireless extender) on which the connection or onboarding operation is initiated.

SUMMARY

An aspect of the present disclosure provides a gateway device for client optimized onboarding in a wireless network. The wireless network is configured to communicatively interconnect the gateway device, one or more wireless extenders, and one or more client devices. In this aspect of the present disclosure, the gateway device includes a network controller, a non-transitory memory storing a program, and a communication interface configured to establish communication connections with the one or more client devices and the one or more wireless extenders via the wireless network.

The network controller is configured to execute the program to determine a first received signal strength indicator (RSSI) of a new client device, receive a second RSSI of the new client device from each of the one or more wireless extenders, and determine a strongest RSSI among the determined first RSSI and the received second RSSI from each of the one or more wireless extenders. Additionally, the network controller is configured to execute the program to receive an onboarding request with respect to any one of the gateway device and the one or more wireless extenders, and send a command to proceed with an onboarding operation of the new client device to any one of the gateway device and the one or more wireless extenders having the strongest RSSI from the new client device.

In an aspect of the present disclosure, the network controller receives the onboarding request based on pressing of a button on any one of the gateway device and the one or more wireless extenders. The button can be a wireless protected setup (WPS) button and the onboarding request can be a request for a wireless protected setup (WPS) operation.

In an aspect of the present disclosure, the network controller receives the onboarding request from a first wireless extender among the one or more wireless extenders, and sends the command to proceed with the onboarding operation with a second wireless extender among the one or more wireless extenders. In this case, the second wireless extender is determined by the network controller to have the strongest RSSI from the new client device. The network controller transmits a command to prevent the onboarding operation to the gateway device and the first wireless extender not determined to have the strongest RSSI from the client device.

In an aspect of the present disclosure, the network controller receives the onboarding request from any one of the one or more wireless extenders or the gateway device, and sends the command to proceed with the onboarding operation with the gateway device. In this case, the gateway device is determined by the network controller to have the strongest RSSI from the new client device. The network controller transmits a command to prevent the onboarding operation to the one or more wireless extenders not determined to have the strongest RSSI from the client device.

An aspect of the present disclosure provides a method for client optimized onboarding in a wireless network. The wireless network is configured to communicatively interconnect a gateway device, one or more wireless extenders, and one or more client devices. The method includes determining, using the network controller, a first received signal strength indicator (RSSI) of a new client device; receiving, using the network controller, a second RSSI of the new client device from each of the one or more wireless extenders; and determining, using the network controller, a strongest RSSI among the determined first RSSI and the received second RSSI from each of the one or more wireless extenders.

The method also includes receiving, using the network controller, an onboarding request with respect to any one of the gateway device and the one or more wireless extenders; and sending, using the network controller, a command to proceed with an onboarding operation of the new client device to any one of the gateway device and the one or more wireless extenders having the strongest RSSI from the new client device.

In an aspect of the present disclosure, the receiving of the onboarding request is from a first wireless extender among the one or more wireless extenders, and the sending of the command to proceed with the onboarding operation is to a second wireless extender among the one or more wireless extenders, wherein the second wireless extender is determined to have the strongest RSSI from the new client device. A command is also transmitted to prevent the onboarding operation to the gateway device and the first wireless extender not determined to have the strongest RSSI from the client device.

In an aspect of the present disclosure, the receiving of the onboarding request is from any one of the one or more wireless extenders or the gateway device, and the sending of the command to proceed with the onboarding operation is with the gateway device, wherein the gateway device is determined by the network controller to have the strongest RSSI from the new client device. In this case, a command is transmitted to prevent the onboarding operation to the one or more wireless extenders not determined to have the strongest RSSI from the client device.

An aspect of the present disclosure provides a non-transitory computer-readable recording medium in a gateway device for client optimized onboarding in a wireless network, the wireless network configured to communicatively interconnect the gateway device, one or more wireless extenders, and one or more client devices, the non-transitory computer-readable recording medium storing one or more programs which when executed by a network controller of the gateway device performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
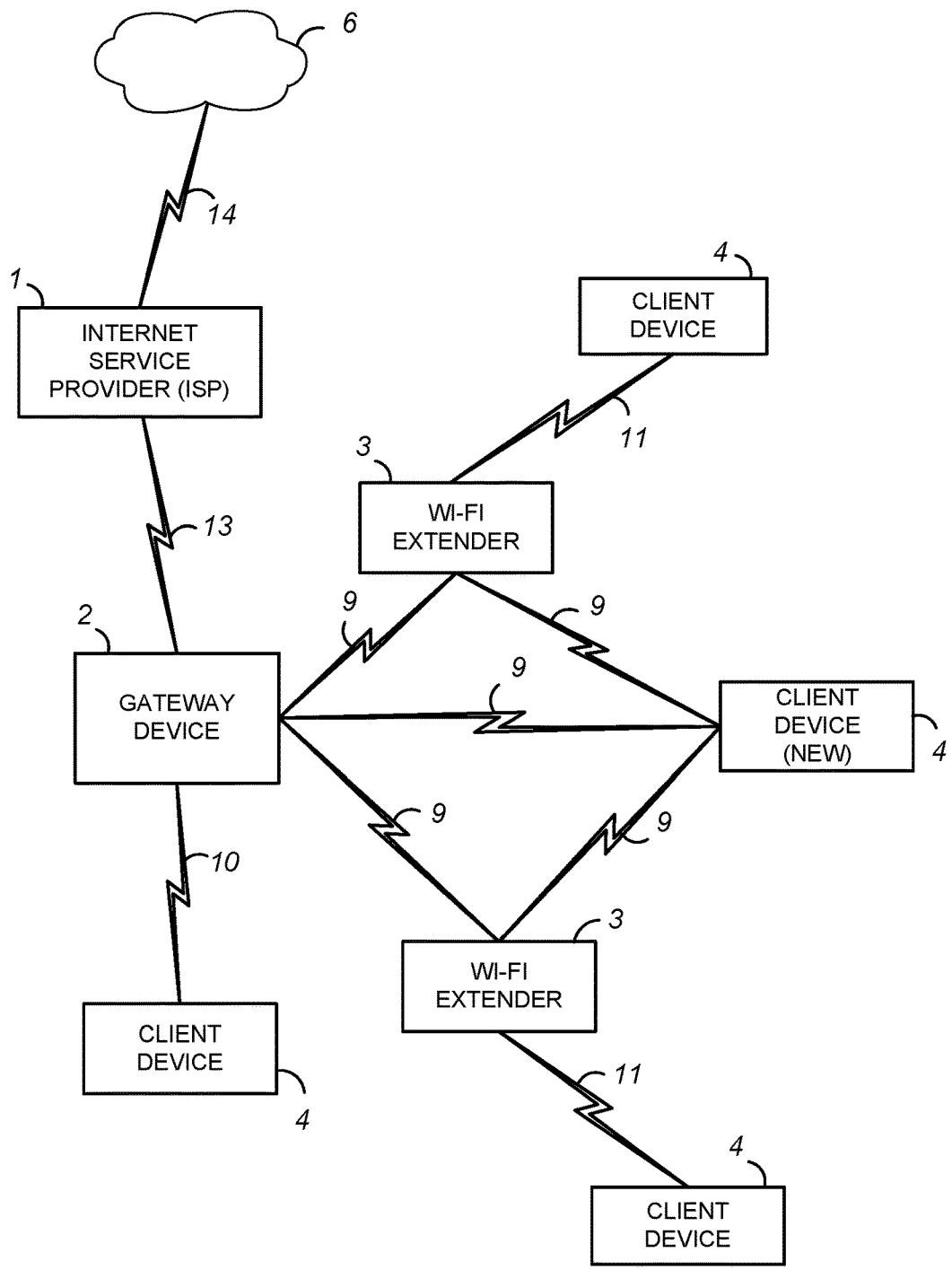
FIG. 1 is a schematic diagram of a system according to an embodiment of the present disclosure.

FIG. 1 is a schematic diagram of a system according to an embodiment of the present disclosure.

As shown in FIG. 1, the main elements of the system include a gateway device 2 connected to the Internet 6 via an Internet Service Provider (ISP) 1 and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connection 9 between the gateway device 2, the wireless extenders 3, and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extenders 3 can be, for example, hardware electronic devices such as access points used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, or other client devices 4.

The connection 11 between the wireless extenders 3 and the client devices 4 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a TV, an IP/QAM STB or an SMD that is capable of decoding audio/video content, and playing over OTT or MSO provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

Figure 2:
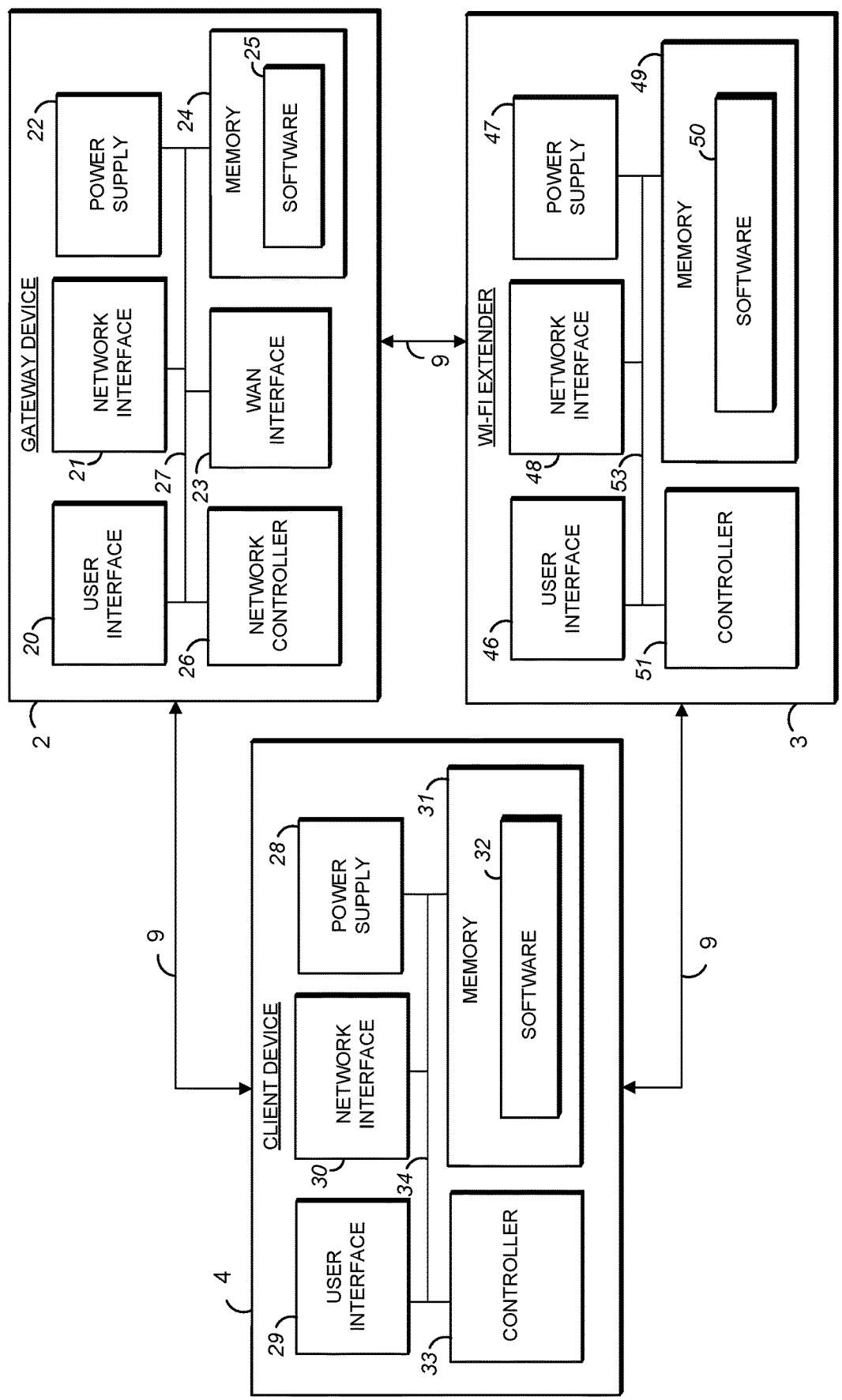
FIG. 2 is a more detailed schematic diagram of an exemplary gateway device, client device, and wireless extender implemented in the system of FIG. 1 according to an embodiment of the present disclosure.

A detailed description of the exemplary internal components of the gateway device 2, the wireless extenders 3, and the client devices 4 shown in FIG. 1 will be provided in the discussion of FIG. 2. However, in general, it is contemplated by the present disclosure that the gateway device 2, the wireless extenders 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the gateway device 2, the wireless extenders 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3, and an exemplary client device 4 implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9 between the gateway device 2, the wireless extender 3, and the client device 4 shown in FIG. 2 are meant to be exemplary connections and are not meant to indicate all possible connections between the gateway devices 2, wireless extenders 3, and client devices. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB or an SMD that is capable of decoding audio/video content, and playing over OTT or MSO provided content received through the gateway device 2.

As shown in FIG. 2, the client device 4 includes a power supply 28, user interface 29, network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3 using the wireless protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms for controlling the general function and operations of the client device 4 in accordance with the embodiments described in the present disclosure (e.g., including the optimized onboarding according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 4 in accordance with the embodiments described in the present disclosure. Communication between the components (e.g., 28-31 and 33) of the client device 4 may be established using an internal bus 34.

The wireless extender 3 can be, for example, a hardware electronic device such as an access point used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 46, a power supply 47, a network interface 48, a memory 49, and a controller 51. The user interface 46 can include, but is not limited to, push buttons, a keyboard, a keypad, an LCD, a CRT, a TFT, an LED, an HD or other similar display device including a display device having touch screen capabilities so as to allow interaction between a user and the wireless extender 3. The power supply 47 supplies power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 can also include a rechargeable battery that can be detached allowing for replacement such as a NiCd, a NiMH, a Li-ion, or a Li-pol battery.

The network interface 48 can include various network cards, interfaces, and circuitry implemented in software and/or hardware to enable communications with the client device 4 and the gateway device 2 using the wireless protocols in accordance with connection 9 (e.g., as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 associated for controlling the general functions and operations of the wireless extender 3 in accordance with the embodiments described in the present disclosure (e.g., including optimized onboarding according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender 3 in accordance with the embodiments described in the present disclosure. General communication between the components (e.g., 46-49 and 51) of the wireless extender 3 may be established using the internal bus 53.

The gateway device 2 can be, for example, a hardware electronic device that can combine the functions of a modem, an access point, and/or a router for providing content received from the content provider 1 to network devices (e.g., wireless extenders 3, client devices 4, and mobile device 5) in the system. It is also contemplated by the present disclosure that the gateway device 2 can include the function of, but is not limited to, an IP/QAM STB or SMD that is capable of decoding audio/video content, and playing OTT or MSO provided content.

As shown in FIG. 2, the gateway device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3 and client device 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance connection 10 (e.g., as described with reference to FIG. 1).

The power supply 22 supplies power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery. The WAN interface 23 may include various network cards, and circuitry implemented in software and/or hardware to enable communications between the gateway device 2 and the ISP 1 using the wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (wireless extenders 3 and client device 4) in the network in accordance with the embodiments described in the present disclosure (e.g., including optimized onboarding of device according to the embodiments of the present disclosure).

The network controller 26 controls the general operations of the gateway device 2 as well as performs management functions related to the other devices (wireless extenders 3 and client device 4) in the network. The network controller can include, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the gateway device 2 in accordance with the embodiments described in the present disclosure. Communication between the components (e.g., 20-22, 24, and 26) of the gateway device 2 may be established using the internal bus 27.

Figure 3:
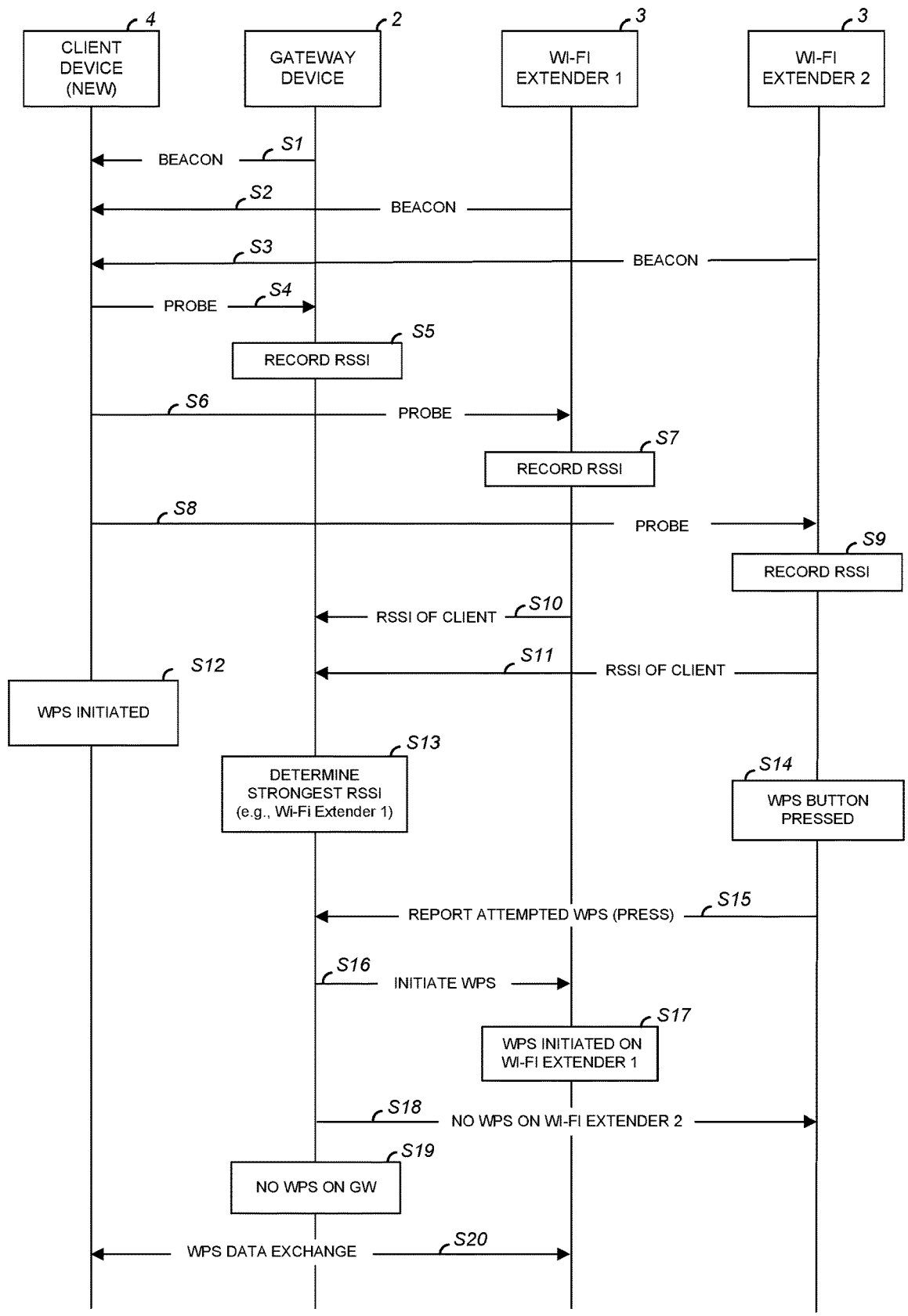
FIG. 3 illustrates a method and algorithm for performing optimized onboarding of a device in a wireless network according to an embodiment of the present disclosure.

FIG. 3 illustrates a method and algorithm for performing optimized onboarding of a device in a wireless network according to an embodiment of the present disclosure. In FIG. 3, it is assumed that the new client device (e.g., client device 4), the gateway device 2, the Wi-Fi extender 1 (e.g., wireless extender 3), and Wi-Fi extender 2 (wireless extender 3) include their respective software 25, 32, 50 stored in their respective memories 24, 31, 49, which when executed by their respective controllers 26, 33, 51 perform the functions and operations in accordance with the embodiments described in the present disclosure (e.g., including optimized onboarding of a device according to the embodiments of the present disclosure).

Although FIG. 3 shows one gateway device 2, one client device 4 (e.g., new client device), and two wireless extenders 3 (e.g., Wi-Fi extender 1 and Wi-Fi extender 2), it is contemplated by the present disclosure that the method and algorithm can be applied to any number of gateway devices 2, client devices 4, and wireless extenders 3 for providing optimized onboarding of devices to any number of wireless networks in the system of FIG. 1.

In steps S1-S3, the gateway device 2, the Wi-Fi extender 1 (e.g. wireless extender 3), and the Wi-Fi extender 2 (wireless extender 3) transmit respective beacon signals to the new client device 4 using their respective network interfaces 21, 30, 48 and the wireless connection 9.

The beacon signals are used to announce the existence of the one or more networks and devices in the one or more networks, and can be transmitted at regular or periodic intervals. The beacon signals transmitted at regular or periodic intervals can allow the new client device 4 to find and identify one or more networks in the system and allow for the exchange of device and network parameters as well as other data between the devices.

It is contemplated by the present disclosure that the beacon signals include beacon frames with parameters such as, but not limited to, timestamps, beacon intervals, capability information, service set identifiers (SSIDs), supported data rates, frequency-hopping (FH) parameter sets, direct-sequence (DS) parameter sets, contention-free (CF) parameter sets, independent basic service set identifiers (IBSSIDs), traffic indication maps (TIMs) and other parameters related to devices and networks in the system. The new client device 4 can generally scan all channels in the system searching for beacons announcing the presence of a nearby access point such as the gateway device 2 or the wireless extenders 3, available networks, and parameters related to the network devices (gateway device 2, wireless extenders 3, or other client devices 4) and the one or more networks.

In step S4, the new client device 4 transmits a probe request using its network interface 30 and wireless connection 9 to the gateway device 2. The gateway device 2 receives the probe request via its network interface 21 and wireless connection 9. Generally, a probe request includes a probe request frame with parameters such as, but not limited to, SSIDs, the data rates supported, basic service set identifiers (BSSIDs), capability information, power level information, association reports, non-association reports, channel usage, dwell times, reason codes, and other similar device and network parameters. Similar to beacon signals, probe request can be transmitted at periodic intervals. Note that client device 4 may send a probe request without first receiving a beacon from at least one access point or gateway device.

In step S5, the gateway device 2 can calculate and record the received signal strength indicator (RSSI) of the new client device 4 based on the probe request received. For example, the network controller 26 of the gateway device 2 executes one or more programs 25 stored in the memory 24 to calculate the RSSI. RSSI is usually expressed in decibels relative to a milliwatt (dBm) from zero to −120 dBm and the closer it is to zero, the stronger the signal. The RSSI value can fluctuate so an average RSSI value can be used for determining the signal strength of the new client device 4. Additionally, other criteria can be implemented such as determining the median or normal distribution of the RSSI values from the new client device 4. The RSSI can be recorded or stored in the memory 24 of the gateway device 2.

In step S6, the new client device 4 transmits a probe request to the Wi-Fi extender 1 (wireless extender 3) using its network interface 30 and wireless connection 9. The Wi-Fi extender 1 (e.g., wireless extender 3) receives the probe request via its network interface 48 and wireless connection 9. In step S7, the Wi-Fi extender 1 (wireless extender 3) can calculate and record the RSSI of the new client device 4 based on the receipt of the probe request. For example, the controller 51 of the Wi-Fi extender 1 (e.g., wireless extender 3) executes one or more programs 50 stored in the memory 49 to calculate the RSSI (e.g., decibels relative to a milliwatt (dBm)). An average RSSI value can be used for determining the signal strength of the new client device (client device 4). Additionally, other criteria can be implemented such as determining the median or normal distribution of the RSSI values from the new client device (client device 4). The RSSI of the new client device 4 can be recorded or stored in the memory 49 of the Wi-Fi extender 1 (e.g., wireless extender 3).

In step S8, the new client device 4 transmits a probe request to the Wi-Fi extender 2 (wireless extender 3) using its network interface 30 and wireless connection 9. The Wi-Fi extender 2 (e.g., wireless extender 3) receives the probe request via its network interface 48 and wireless connection 9. In step S9, the Wi-Fi extender 2 (wireless extender 3) can calculate and record the RSSI of the new client device 4 based on the receipt of the probe request. For example, the controller 51 of the Wi-Fi extender 2 (e.g., wireless extender 3) executes one or more programs 50 stored in the memory 49 to calculate the RSSI (e.g., decibels relative to a milliwatt (dBm)). RSSI is usually expressed in decibels relative to a milliwat (dBm) from 0 to −120 dBm and the closer it is to zero, the stronger the signal is. An average RSSI value can be used for determining the signal strength of the new client device 4. Additionally, other criteria can be implemented such as determining the median or normal distribution of the RSSI values from the new client device 4. The RSSI of the new client device 4 can be recorded or stored in the memory 49 of the Wi-Fi extender 2 (e.g., wireless extender 3).

In steps S10 and S11, the Wi-Fi extender 1 and the Wi-Fi extender 2 (e.g., wireless extenders 3) transmit the RSSI for the new client device to the gateway device 2 using their respective network interfaces 48 and connection 9. The gateway device 2 receives the RSSIs of the new client device 4 from each of the Wi-Fi extender 1 and the Wi-Fi extender 2 (e.g., wireless extenders 3) via its network interface 21 and stores the RSSIs in its memory 24. In step S12, the new client device 4 initiates a WPS operation. The initiation of the WPS operation by the new client device 4 can be performed using, for example, a hard or physical button via the user interface 29 or by the execution of a soft button using a mobile application or a graphical user interface (GUI) via the user interface 29.

In step S13, the gateway device 2 determines which network device (e.g., gateway device 2, the Wi-Fi extender 1, or the Wi-Fi extender 2) has recorded the strongest RSSI from the new client device 4 (e.g., decibels relative to a milliwatt (dBm)). For example, the network controller 26 of the gateway device 2 executes one or more programs 25 stored in the memory 24 to compare all the RSSIs (e.g., decibels relative to a milliwatt (dBm)) and determines the strongest RSSI from the new client device 4. In the example of FIG. 3, Wi-Fi extender 1 (wireless extender 3) is determined to have the strongest RSSI. However, it contemplated by the present disclosure that the gateway device 2 can determine that another Wi-Fi extender (e.g. Wi-Fi extender 2) or even determine the gateway device 2 itself has the strongest RSSI from the new client device 4.

Shortly after initiating the WPS operation on the new client device 4, the WPS operation can also be initiated on a desired WPS-enabled device such as a gateway device 2 or a wireless extender 3 for onboarding the new client device 4 to one or more networks. As shown in FIG. 3, in step S14, the WPS button is pressed or pushed on the Wi-Fi extender 2 (e.g., wireless extender 3) as the desired WPS-enabled device for onboarding the new client device 4 to one or more networks. In this example, the WPS operation is attempted on the Wi-Fi extender 2 (e.g., wireless extender 3) using, for example, a hard or physical button (e.g., WPS button) via the user interface 46 of the Wi-Fi extender 2 (e.g., wireless extender 3). However, it is also contemplated by the present disclosure that the attempting of the WPS operation on the Wi-Fi extender 2 (e.g., wireless extender 3) is not limited to using a WPS button and can be performed using other means (e.g., a different physical button, or a soft button on GUI).

In step S15, the Wi-Fi extender 2 (e.g., wireless extender 3) reports the pressing of the WPS button and attempting of the WPS operation on the Wi-Fi extender 2 (e.g., wireless extender 3) to the gateway device 2 using the network interface 48 and connection 9. In step S16, the network controller 26 of gateway device 2 receives the report from the Wi-Fi extender 2 regarding the attempting of the WPS operation, but transmits a command to initiate the WPS operation on the Wi-Fi extender 1 using network interface 21 and connection 9. It is contemplated by the present disclosure that if a report of attempting of the WPS operation is not received by the gateway device 2 for a predetermined period, the gateway device 2 can continue to evaluate the RSSI from the client device. That is, the network device (e.g. gateway device 2 or wireless extender 3) recording the strongest RSSI from the new client device 4 can change over time. This operation is described in more detail with reference to FIG. 4.

As noted above, although the WPS operation was attempted (e.g., WPS button) on the Wi-Fi extender 2 (e.g., wireless extender 3), a command is sent to initiate the WPS operation on Wi-Fi extender 1 (e.g., wireless extender 1) because Wi-Fi extender 1 has been determined by the network controller 26 of the gateway device 2 to have the strongest RSSI with respect to the new client device 4. Note that a wireless extender 3 or access point as well as a client device 4 may have more than one radio frequency (RF) interface. For example, the network devices may have a 2.4 GHz radio as well as a 5 GHz radio. A device may probe on more than one band, and the access point may need to select from multiple bands on an extender as well as between multiple extenders.

In step S17, the Wi-Fi extender 1 (e.g., wireless extender 3) receives the command from the gateway device 2 via its network interface 48 and connection 9, and initiates a WPS operation, as instructed. In steps S18, the network controller 26 of the gateway device 2 transmits a command to prevent a WPS operation from proceeding on the Wi-Fi extender 2 (e.g., wireless extender 3). Similarly, in steps S19, the network controller 26 transmits a command to prevent the gateway device 2 from proceeding with a WPS operation. In step S20, the WPS operation proceeds between the new client device 4 and the Wi-Fi extender 1 (e.g., wireless extender 3). For example, respective onboarding software 32, 50 of the new client device 4 and the Wi-Fi extender 1 (e.g., wireless extender 3) perform a standard WPS operation by exchanging network data and information (e.g., service set identifier (SSID) and network pass phrase or password) needed to establish a wireless connection between the new client device 4 and the Wi-Fi extender 1 (e.g., wireless extender 3).

The optimized onboarding method and algorithm of FIG. 3 show the WPS operation being attempted by a push button on the Wi-Fi extender 2 (e.g., wireless extender 3) as the desired WPS-enabled device for onboarding the new client device 4 to one or more networks. However, it is contemplated by the present disclosure that the attempting of the WPS operation can be on any WPS-enabled device for onboarding the new client device 4 to one or more networks including any other wireless extender 3 or the gateway device 2 itself.

For example, the WPS operation could have been attempted on Wi-Fi extender 1 (wireless extender 3) or the gateway device 2 as the desired WPS-enabled device for onboarding the new client device 4 to one or more networks (e.g., as in step S14). In this example, the attempting of the WPS operation on the Wi-Fi extender 1 (e.g., wireless extender 3) or the gateway device 2 is performed using, for example, a hard or physical button (e.g., WPS button) via the respective user interface 21, 47. The attempting of the WPS operation is not limited to using a WPS button and could be performed using other means (e.g., a different physical button, or a soft button on GUI).

The Wi-Fi extender 1 (e.g., wireless extender 3) or gateway device 2 would report the pressing of the WPS button and the attempting of the WPS operation to the gateway device 2 (e.g., as in step S15), and the network controller 26 of gateway device 2 would receive the report from the Wi-Fi extender 1 or the gateway device 2, but transmits a command to initiate the WPS operation to the WPS-enable device (e.g., gateway device 2 or wireless extender 3) determined to have the strongest RSSI using network interface 21 and connection 9 (e.g., as in step S16). For this example, it is assumed that the Wi-Fi extender 1 is again determined to have the strongest RSSI from the new client device 4.

That is, although the WPS operation was attempted (e.g., WPS button press) on the Wi-Fi extender 1 (e.g., wireless extender 3) or the gateway device 2, a command will be sent to initiate the WPS operation on the WPS-enabled device determined by the network controller 26 of the gateway device 2 to have the strongest RSSI with respect to the new client device 4 (e.g., Wi-Fi extender 1).

In this example, the Wi-Fi extender 1 (e.g., wireless extender 3) receives the command from the gateway device 2 via its network interface 48 and connection 9 and initiates a WPS operation, as instructed (e.g., in step S17) by including a WPS flag in its next beacon. The network controller 26 of the gateway device 2 transmits a command to prevent the WPS operation from proceeding on the Wi-Fi extender 2 (e.g., wireless extender 3) and the gateway device 2 (e.g., as in steps S18 and S19). The WPS operation would then proceed between the new client device 4 and the Wi-Fi extender 1 (e.g., wireless extender 3) (e.g., as in step S20).

The method and algorithm of FIG. 3, provides optimized connecting or onboarding of a new device to a wireless network by using the best WPS-enabled device (e.g., gateway device, access point, or wireless extender), regardless of the WPS-enabled device (e.g., gateway, access point, and wireless extender) on which the connection or onboarding operation is initiated.

Figure 4:
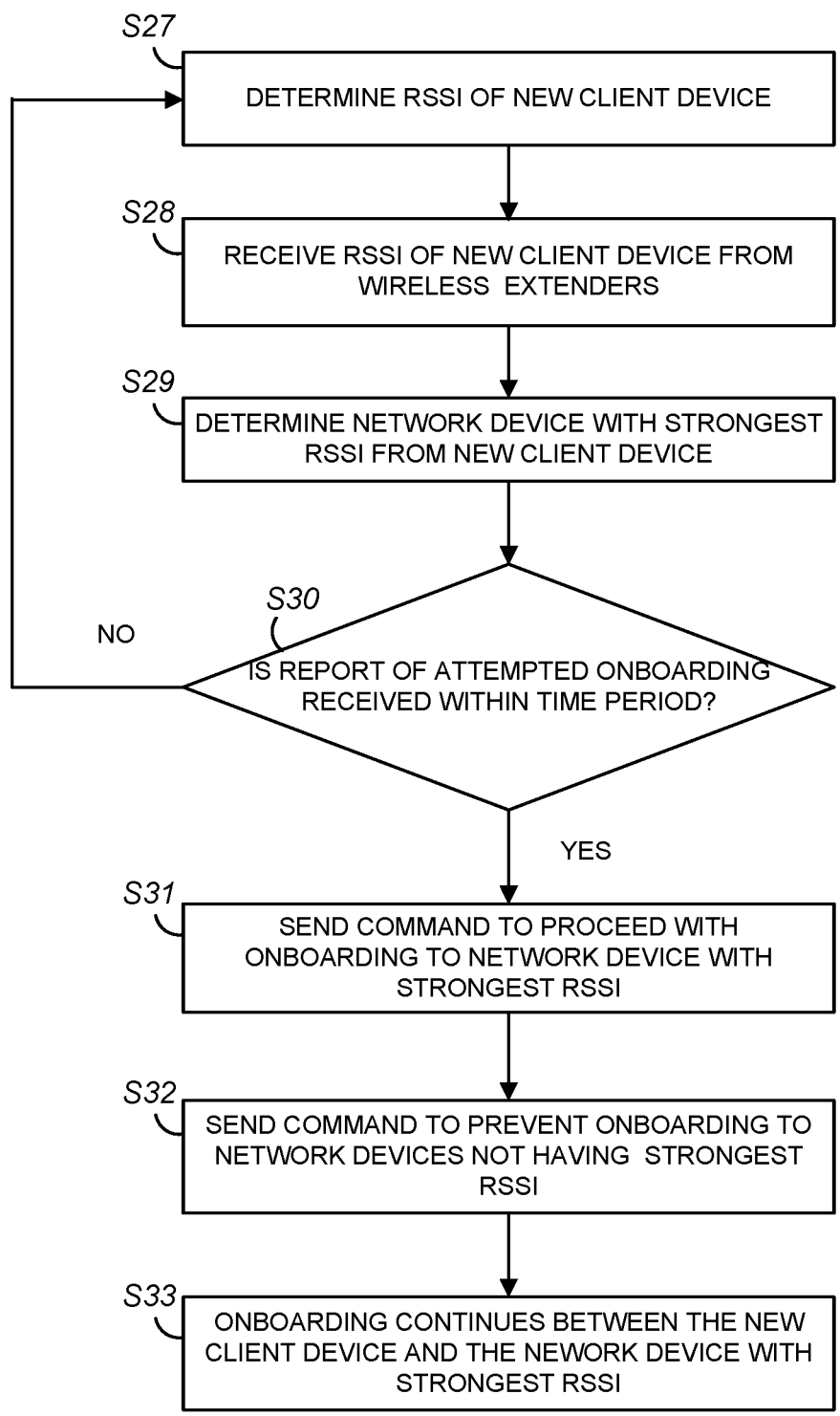
FIG. 4 illustrates a method and algorithm for performing optimized onboarding of a device in a wireless network according to an embodiment of the present disclosure.

FIG. 4 illustrates a method and algorithm for performing optimized onboarding of a device in a wireless network according to an embodiment of the present disclosure. The exemplary method and algorithm of FIG. 4 illustrate the action taken by the gateway device 2 when there is a delay in receiving a report regarding the attempting of an onboarding operation (e.g., WPS) from a network device (e.g., gateway device 2 or wireless extender 3). In FIG. 4, it is assumed that the new client device 4, the gateway device 2, and each of the wireless extenders 3 include their respective software 25, 32, 50 stored in their respective memories 24, 31, 49, which when executed by their respective controllers 26, 33, 51 perform the functions and operations in accordance with the embodiments described in the present disclosure (e.g., including optimized onboarding of a device according to the embodiments of the present disclosure).

In step S27, the gateway device 2 calculates and records the received signal strength indicator (RSSI) of the new client device 4 based on a probe request received from the client device 4. For example, the network controller 26 of the gateway device 2 executes one or more programs 25 stored in the memory 24 to calculate the RSSI (e.g., decibels relative to a milliwatt (dBm)) (e.g., similar to step S5 of FIG. 3).

In step S28, the wireless extenders 3 transmit the RSSI for the new client device to the gateway device 2 using their respective network interfaces 48 and connection 9. The wireless extenders also determined the RSSI of the client device 4 based on probe requests received from the client device (e.g., similar to steps S4 and S6 of FIG. 3). The gateway device 2 receives the RSSIs from each of the wireless extenders 3 via its network interface 21 and stores the RSSIs in its memory 24 (e.g., as in steps S10 and S11).

In steps S29, the gateway device 2 determines which network device (e.g., gateway device 2 or wireless extenders 3) has recorded the strongest RSSI from the new client device 4 (e.g., decibels relative to a milliwatt (dBm)). For example, the network controller 26 of the gateway device 2 executes one or more programs 25 stored in the memory 24 to compare all the RSSIs and determines the strongest RSSI from the new client device 4 (e.g., similar to step S13 of FIG. 3).

Shortly after attempting to initiate a WPS operation on the new client device 4, a WPS operation can also be attempted on a desired WPS-enabled device such as a gateway device 2 or a wireless extender 3 for onboarding the new client device 4 to one or more networks. However, sometimes there can be a delay in the attempting of the WPS operation on a desired WPS-enabled device. If a report of the attempting of the WPS operation on a network device (e.g. gateway device 2 or wireless extender 3) is not received by the gateway device 2 for a predetermined period, it could impact the initial determination of which network device (e.g. gateway device 2 or wireless extender 3) has the strongest RSSI from the new client device. That is, the network device (e.g. gateway device 2 or wireless extender 3) recording the strongest RSSI from the new client device can change over time.

Therefore, to address this problem, the network controller 26 of the gateway device can set a time period after determining which network device (e.g., gateway device 2 or wireless extenders 3) has recorded the strongest RSSI from the new client device 4. The time period can be, for example, 30 seconds to 5 minutes. However, the time period is not limited to 30 seconds to 5 minutes and can vary depending on the network and network devices implemented in the system.

In step S30, the network controller 26 determines if a report of attempting of a WPS operation has been received from a network device (e.g., gateway device 2 or wireless extenders 3) within a predetermined period. If the report of attempting of a WPS operation has not been received within a predetermined period, the network controller 26 of the gateway device 2 will continue to evaluate RSSI information and determine which network device (e.g., gateway device 2, or wireless extenders 3) has recorded the strongest RSSI from the new client device 4 (e.g., decibels relative to a milliwatt (dBm)) (e.g., similar to steps S27-S29 of FIG. 3). In step S30, if it is determined that a report of the attempting of a WPS operation has been received within a predetermined period, in step S31, the network controller 26 of the gateway device 2 will transmits a command to initiate with the WPS operation to the network device (e.g., gateway device 2 or wireless extender 3) determined to have the strongest RSSI from the new client device 4 (e.g., similar to step S17 in FIG. 3).

In step S32, the network controller 26 of the gateway device 2 transmits a command to prevent the WPS operation from proceeding on the network devices (e.g., gateway device 2 or wireless extenders 3) not determined to have the strongest RSSI (e.g., similar to steps S18 and S19 of FIG. 3). In step S33, the WPS operation proceeds between the new client device 4 and the network device (e.g., gateway device 2, or wireless extenders 3) determined to have the strongest RSSI from the new client device 4 (e.g., similar to step S20 of FIG. 3).

Shortly after attempting a WPS operation on the new client device 4, a WPS operation is initiated on a desired WPS-enabled device such as a gateway device 2 or a wireless extender 3 for onboarding the new client device 4 to one or more networks. If a report of the attempting of the WPS operation is not received by the gateway device 2 for a predetermined period (e.g., similar to step S15 of FIG. 3), it could impact the initial determination of which network device (e.g. gateway device 2 or wireless extender 3) recorded the strongest RSSI from the new client device 4. That is, the network device (e.g. gateway device 2 or wireless extender 3) recording the strongest RSSI from the new client device can change over time. The method and algorithm of FIG. 4 address this problem.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 3 and 4. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. A gateway device for client optimized onboarding in a wireless network, the wireless network configured to communicatively interconnect the gateway device, one or more wireless extenders, and one or more client devices, the gateway device comprising:
   a network controller;
   a non-transitory memory storing a program; and
   a communication interface configured to establish communication connections with the one or more client devices and the one or more wireless extenders via the wireless network,
   the network controller is configured to execute the program to:
   determine a first received signal strength indicator (RSSI) of a new client device;
   receive a second RSSI of the new client device from each of the one or more wireless extenders;
   determine a strongest RSSI among the determined first RSSI and the received second RSSI from each of the one or more wireless extenders;
   receive an onboarding request with respect to any one of the gateway device and the one or more wireless extenders;
   transmit a first command to proceed with an onboarding operation of the new client device to any one of the gateway device and the one or more wireless extenders having the strongest RSSI from the new client device; and
   transmit a second command to the one or more wireless extenders not determined to have the strongest RSSI from the client device to prevent the onboarding operation of the new client device.

2. The gateway device of claim 1, wherein the network controller determines the RSSI of the new client device based on a probe request received from the new client device.

3. The gateway device of claim 1, wherein the network controller receives the onboarding request based on pressing of a button on any one of the gateway device and the one or more wireless extenders.

4. The gateway device according to claim 3, wherein the button is a wireless protected setup (WPS) button and the onboarding request is a request for a wireless protected setup (WPS) operation.

5. The gateway device according to claim 1, wherein the network controller receives the onboarding request from a first wireless extender among the one or more wireless extenders, and
the network controller transmits the first command to proceed with the onboarding operation with a second wireless extender among the one or more wireless extenders,
wherein the second wireless extender is determined by the network controller to have the strongest RSSI from the new client device.

6. The gateway device according to claim 5, wherein the network controller
transmits the second command to the first wireless extender not determined to have the strongest RSSI from the client device to prevent the onboarding operation of the new client device.

7. The gateway device according to claim 1, wherein the network controller receives the onboarding request from any one of the one or more wireless extenders or the gateway device, and
the network controller transmits the first command to proceed with the onboarding operation with the gateway device,
wherein the gateway device is determined by the network controller to have the strongest RSSI from the new client device.

8. The gateway device according to claim 1, wherein the network controller executes the program to:
determine a third received signal strength indicator (RSSI) of the new client device, receive a fourth RSSI of the new client device from each of the one or more wireless extenders, and determine again the strongest RSSI among the determined first RSSI and the received second RSSI from each of the one or more wireless extenders, when the onboarding request is not received for a predetermined period.

9. A method for client optimized onboarding in a wireless network, the wireless network configured to communicatively interconnect a gateway device including a network controller, one or more wireless extenders, and one or more client devices, the method comprising:
determining, using the network controller, a first received signal strength indicator (RSSI) of a new client device;
receiving, using the network controller, a second RSSI of the new client device from each of the one or more wireless extenders;
determining, using the network controller, a strongest RSSI among the determined first RSSI and the received second RSSI from each of the one or more wireless extenders;
receiving, using the network controller, an onboarding request with respect to any one or the gateway device and the one or more wireless extenders;
transmitting, using the network controller, a first command to proceed with an onboarding operation of the new client device to any one of the gateway device and the one or more wireless extenders having the strongest RSSI from the new client device; and
transmitting a second command to the one or more wireless extenders not determined to have the strongest RSSI from the client device to prevent the onboarding operation of the new client device.

10. The method of claim 9, wherein the receiving of the onboarding request by the network controller is from a first wireless extender among the one or more wireless extenders, and
transmitting of the first command to proceed with the onboarding operation is to a second wireless extender among the one or more wireless extenders,
wherein the second wireless extender is determined by the network controller to have the strongest RSSI from the new client device.

11. The method of claim 10,
wherein the second command is transmitted to first wireless extender not determined to have the strongest RSSI from the client device to prevent the onboarding operation of the new client device.

12. The method of claim 9, wherein the receiving of the onboarding request by the network controller is from any one of the one or more wireless extenders or the gateway device, and
the transmitting of the first command to proceed with the onboarding operation is with the gateway device,
wherein the gateway device is determined by the network controller to have the strongest RSSI from the new client device.

13. The method of claim 9, further comprising:
determining a third received signal strength indicator (RSSI) of the new client device; receiving a fourth RSSI of the new client device from each of the one or more wireless extenders; and determining again the strongest RSSI among the determined first RSSI and the received second RSSI from each of the one or more wireless extenders, when the onboarding request is not received for a predetermined period.

14. A non-transitory computer-readable recording medium in a gateway device for client optimized onboarding in a wireless network, the wireless network configured to communicatively interconnect the gateway device, one or more wireless extenders, and one or more client devices, the non-transitory computer-readable recording medium storing one or more programs which when executed by a network controller of the gateway device performs steps comprising:
determining a first received signal strength indicator (RSSI) of a new client device;
receiving a second RSSI of the new client device from each of the one or more wireless extenders;
determining a strongest RSSI among the determined first RSSI and the received second RSSI from each of the one or more wireless extenders;
receiving an onboarding request with respect to any one or the gateway device and the one or more wireless extenders;
transmitting a first command to proceed with an onboarding operation of the new client device to any one of the gateway device and the one or more wireless extenders having the strongest RSSI from the new client device; and
transmitting a second command to the one or more wireless extenders not determined to have the strongest RSSI from the client device to prevent the onboarding operation of the new client device.

15. The non-transitory computer-readable recording medium according to claim 14, wherein the receiving of the onboarding request by the network controller is from a first wireless extender among the one or more wireless extenders, and transmitting of the first command to proceed with the onboarding operation is to a second wireless extender among the one or more wireless extenders, wherein the second wireless extender is determined by the network controller to have the strongest RSSI from the new client device.

16. The non-transitory computer-readable recording medium according to claim 15, wherein the second command is transmitted to the first wireless extender not determined to have the strongest RSSI from the client device to prevent the onboarding operation of the new client device.

17. The non-transitory computer-readable recording medium according to claim 14, wherein the receiving of the onboarding request by the network controller is from any one of the one or more wireless extenders or the gateway device, and the transmitting of the first command to proceed with the onboarding operation is with the gateway device, wherein the gateway device is determined by the network controller to have the strongest RSSI from the new client device.

* * * * *